(12) United States Patent
May, Jr. et al.

(10) Patent No.: US 10,135,748 B2
(45) Date of Patent: Nov. 20, 2018

(54) SWITCHING BETWEEN MEDIA STREAMS

(71) Applicant: Apple Inc., Cupertino, CA (US)

(72) Inventors: William B. May, Jr., Sunnyvale, CA (US); David L. Biderman, San Jose, CA (US); John Y. Su, Sunnyvale, CA (US); Roger N. Pantos, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 14/500,669

(22) Filed: Sep. 29, 2014

(65) Prior Publication Data
US 2016/0094468 A1 Mar. 31, 2016

(51) Int. Cl.
G06F 17/30 (2006.01)
H04N 21/24 (2011.01)
H04L 12/729 (2013.01)
H04L 12/873 (2013.01)
H04N 21/262 (2011.01)
H04N 21/442 (2011.01)
H04N 21/643 (2011.01)
H04N 21/845 (2011.01)
H04N 21/2343 (2011.01)
H04N 21/6373 (2011.01)

(52) U.S. Cl.
CPC ........ H04L 47/52 (2013.01); G06F 17/30887 (2013.01); H04L 45/125 (2013.01); H04N 21/23439 (2013.01); H04N 21/2401 (2013.01); H04N 21/26258 (2013.01); H04N 21/4424 (2013.01); H04N 21/44209 (2013.01); H04N 21/6373 (2013.01); H04N 21/643 (2013.01); H04N 21/8456 (2013.01)

(58) Field of Classification Search
CPC ....... H04N 21/23439; H04N 21/26258; H04N 21/44209; H04N 21/4424; H04N 21/6373; H04N 21/2401; H04N 21/643; H04N 21/8456; H04L 45/125; H04L 47/52; G06F 17/30887
See application file for complete search history.

(56) References Cited

U.S. PATENT DOCUMENTS 8,589,583 B2 11/2013 Gutarin et al.
2010/0189183 A1* 7/2010 Gu et al. .......... H04N 21/23439
375/240.28

(Continued)

FOREIGN PATENT DOCUMENTS

WO WO 2012/114107 A2 8/2012

OTHER PUBLICATIONS

Apple Inc., "HTTP Live Streaming Overview," Apple Developer, Feb. 11, 2014; 38 pages.

(Continued)

Primary Examiner — Philip J Chea
Assistant Examiner — Mohammed Ahmed
(74) Attorney, Agent, or Firm — Womble Bond Dickinson (US) LLP

(57) ABSTRACT

Methods and systems for switching between media streams can use a comparison of an average bandwidth for a new stream to an observed bit rate for an existing stream in order to determine whether to switch to the new stream. A check on the amount of data buffered for the existing stream can also be performed in order to determine whether a system should switch to the new stream.

13 Claims, 5 Drawing Sheets

(56) References Cited

U.S. PATENT DOCUMENTS

| | | |
|---|---|---|
| 2011/0099594 A1 | 4/2011 | Chen et al. |
| 2011/0246621 A1* | 10/2011 | May, Jr. ............ H04N 7/17318 709/219 |
| 2012/0254365 A1 | 10/2012 | Adimatyam et al. |
| 2013/0058393 A1* | 3/2013 | Soroushian .... H04N 21/234372 375/240.01 |
| 2013/0179588 A1* | 7/2013 | McCarthy ........ H04N 21/23418 709/231 |
| 2014/0013376 A1 | 1/2014 | Xu et al. |
| 2014/0052823 A1 | 2/2014 | Gavade et al. |

OTHER PUBLICATIONS

Cao, Y. et al., "A QoE Friendly Rate Adaptation Method for DASH," 2014 IEEE International Symposium on Broadband Multimedia Systems and Broadcasting, IEEE (Jun. 25, 2014), 6 pages.

De Simone, F. et al., "Comparison of DASH Adaptation Strategies Based on Bitrate and Quality Signalling," 2013 IEEE 15th International Workshop on Multimedia Signal Processing (MMSP), IEEE (Sep. 30-Oct. 2, 2013), Pula (Sardinia) Italy; pp. 087-092.

Miller, K. et al., "Adaptation Algorithm for Adaptive Streaming over HTTP," Proceedings of 2012 IEEE 19$^{th}$ International Packet Video Workshop (May 10-11, 2012), Munich, Germany; pp. 173-178.

Pantos, R.P. et al., "HTTP Live Streaming: draft-pantos-http-live-streaming-13.txt," Internet Engineering Task Force (IETF), Standard Working Draft, Internet Society (ISOC) 4, Geneva, Switzerland (Apr. 16, 2014), pp. 1-37.

PCT International Search Report and Written Opinion for International Application No. PCT/US2015/047768, dated Nov. 27, 2015, 19 pages.

Preliminary Report on Patentability for International Application No. PCT/US20015/047768, dated Apr. 13, 2017, 12 pages.

* cited by examiner

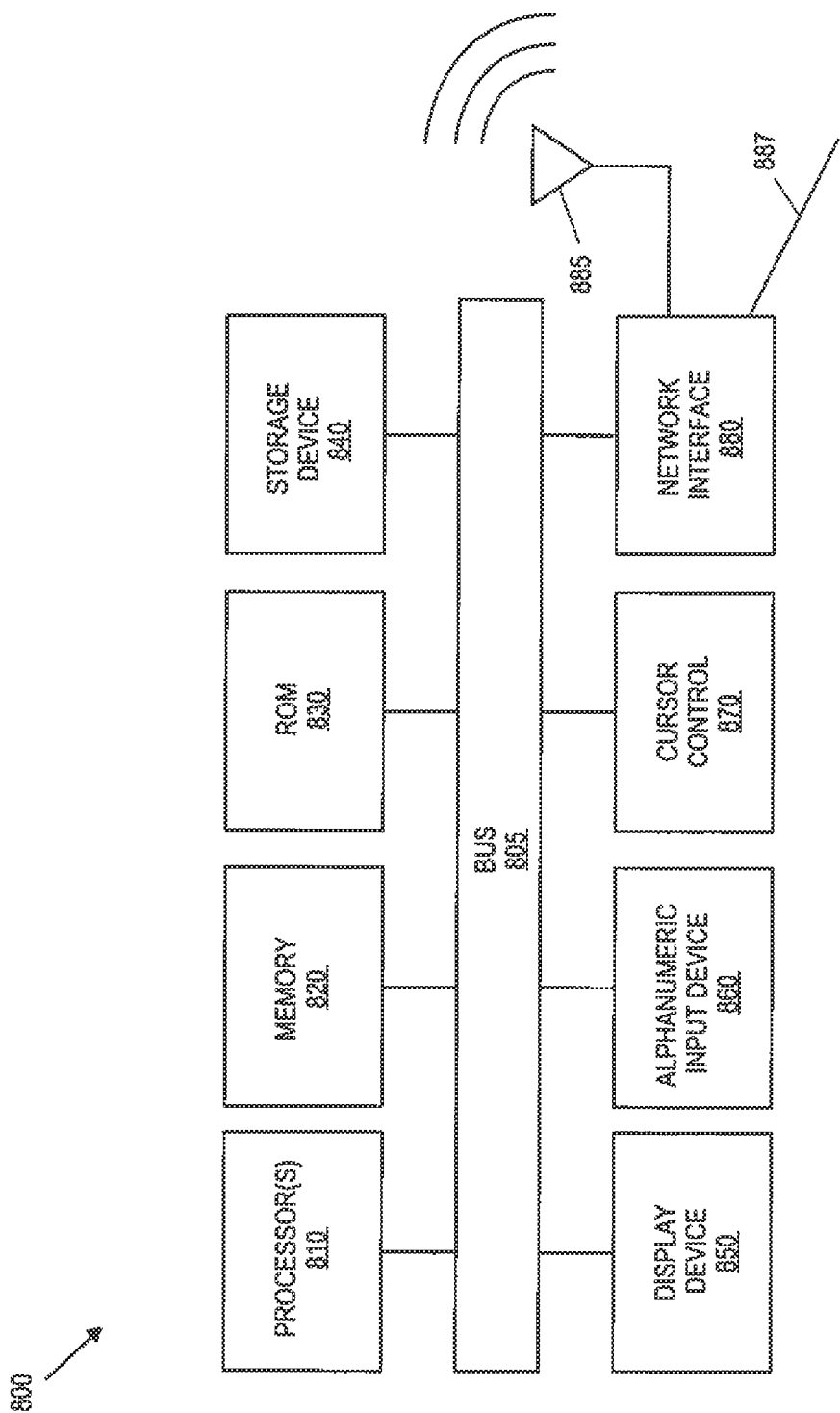

SWITCHING BETWEEN MEDIA STREAMS

BACKGROUND

Streaming of media, such as a TV show or movie or radio content, generally refers to the transmission of the media from a server device which is received as a stream of segments of the content by a client device. Typically, the content is not stored at the client device and is presented soon after receiving segments in the stream from the server device. An example in the prior art of streaming media includes a streaming technique which uses the HTTP protocol to deliver the streaming content through the use of one or more playlists. U.S. Pat. No. 8,099,473 and published U.S. Application No. 2012/0311094 provide a description of the use of playlists to stream media, such as video, audio, or both video and audio through the use of an HTTP compliant protocol.

SUMMARY OF THE DESCRIPTION

There are multiple aspects in this description which relate to methods and systems for providing streaming media. In one aspect, a method for processing media specified in one or more playlists includes receiving data representing a plurality of variants of media and determining a peak bandwidth and an average bandwidth at a server device for each variant of the media, wherein each variant shows the same media (e.g. same movie or TV show or other content) but uses different encodings, and then creating a master playlist that includes a universal resource indicator (URI) for each variant. Each URI can be used by a client device in retrieving a media playlist for one of the variants, and the master playlist, in one embodiment, includes data that specifies the peak bandwidth and the average bandwidth for each variant. A client device can then request a master playlist which is then transmitted by a server device to a client device. The server device that transmits the master playlist to the client device can be the same server device that created the master playlist, or in another embodiment the server device that transmits the master playlist can be separate and distinct from the server device ("playlist creation server") that created the master playlist.

The client device can then use the peak bandwidth and the average bandwidth to determine whether to switch from one variant to another variant in the master playlist. In one embodiment, a client device can perform this method by selecting and receiving a first media playlist which includes URIs for one or more segments of a first variant. The client device can further determine an observed bit rate during the downloading of the segments of the first variant and store media of the first variant in a buffer before displaying the media. The client device can then determine, before switching between the variants, whether the amount of data in the buffer exceeds an estimated value which is related to an estimated amount of data to be downloaded for a second variant. In one embodiment, the estimated value can be derived from a combination of the peak bandwidth of the second variant and a target duration of one or more segments of the second variant. The client device can also compare the average bandwidth, obtained from the master playlist, for the second variant to the observed bit rate; based upon that comparison and the status of the data in the buffer, the client device can switch to the second variant in response to determining that the amount of data in the buffer exceeds the estimated value and in response determining that the observed bit rate exceeds the average bandwidth. In one embodiment, the second variant can provide a higher quality encoding such as a higher resolution encoding of a video media.

The above summary does not include an exhaustive list of all embodiments in this disclosure. Other methods are described, and systems and machine readable non-transitory storage media are also described. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 5 shows an example of a data processing system which can implement one or more of the methods described herein.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that at least some of the operations described may be performed in a different order. Moreover, some operations may be performed in parallel rather than sequentially.

U.S. Pat. No. 8,099,473 and U.S. Patent Application Publication No. U.S. 2012/0311094 provide a background description of methods for providing streaming media through the use of playlists in conjunction with transmission over the HTTP protocol or a compliant HTTP protocol or other applicable protocols; U.S. Pat. No. 8,099,473 and U.S. Patent Application Publication No. U.S. 2012/0311094 are hereby incorporated herein by reference in their entirety. These documents describe various data processing systems, such as the systems shown in FIGS. 4, 5, and 8 of U.S. Pat. No. 8,099,473 which can be used with one or more of the embodiments described herein. Moreover, that patent describes various methods for switching between variants for the same media program, such as a TV show or movie; see for example, the discussion of switching between variants with reference to FIGS. 9A through 9D of that U.S. patent.

Figure 1:
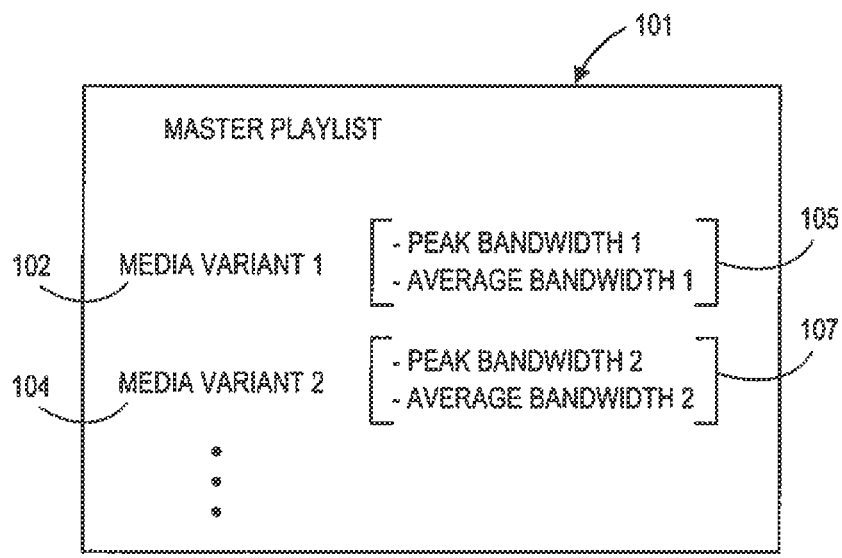
FIG. 1 shows an example of a master playlist having two variants, each with a value for a peak bandwidth and a value for an average bandwidth.

In one aspect of this present disclosure, an embodiment for switching between variants employs an average bandwidth value which is indicated in a master playlist rather than the prior approach which used a peak bandwidth value when deciding whether to switch to another variant. This peak bandwidth value can be defined as the maximum bit rate in any segment within the stream which includes multiple segments. FIGS. 1, 2A, 2B, and 3 illustrate one or more embodiments which can use the average bandwidth values when determining whether to switch to another variant. FIG. 1 shows an example of a master playlist 101 which includes at least two variants of the same media presentation. In particular, media variant 1 and media variant 2 are labeled as variants 102 and 104, and each of those variants has an associated peak bandwidth value and an average bandwidth value. In particular, the variant 102 includes an associated peak bandwidth and average bandwidth 105 while the variant 104 includes an associated peak bandwidth and average bandwidth 107. Peak bandwidth 105 can be a value determined by a server or some other system which determines or estimates the maximum bit rate of any single segment of the content when the content is presented; the average bandwidth is a bit rate of the content while presented which is an average amount over time. Normally, the average bandwidth is calculated or determined over the entire time of the content. For example, if the content is a one-hour TV show, then the average bandwidth is determined over the one hour period of time. In one embodiment, the average bandwidth can be calculated by dividing the total amount of transmitted content (in, for example, bits, bytes, kilobytes, etc. for the entire period of time that the content is normally presented) by that period of time. The average bandwidth can be expressed as a number of bits per second and can be approximated through rounding of any calculated value. The peak bandwidth and the average bandwidth values are based on the data in the stream when the content is presented (e.g., displayed) at normal ("1×") playback speed and these values are independent of the speed of the download connection between a server (that transmits the content to a client) and the receiving client. It will be understood that the average bandwidth or bit rate is normally less than the peak bandwidth or bit rate. For example, many videos have scenes which do not vary over time and those scenes tend to have lower bit rates and thus the average bit rate or bandwidth for a video with such scenes will be lower than a peak bandwidth for the video which can occur during an action scene where objects, images, etc. are moving rapidly across the screen or colors are rapidly changing, etc. An example of a sample master playlist which includes peak bandwidth and average bandwidth values for each variant in the master playlist is provided below.

```
#EXTM3U
##############################
# Alt Audio Language Groups
##############################
#EXT-X-MEDIA:TYPE=AUDIO, GROUP-ID="aac-hi", LANGUAGE="eng", NAME="English".
        AUTOSELECT=YES, DEFAULT=YES, URI="adventureland_audio_english_128kbs_AAC/prog_index.m3u8"
#EXT-X-MEDIA:TYPE=AUDIO, GROUP-ID="aac-hi", LANGUAGE="fre", NAME="French".
        AUTOSELECT=YES, DEFAULT=NO, URI="adventureland_audio_french_128kbs_AAC/prog_index.m3u8"
#EXT-X-MEDIA:TYPE=AUDIO, GROUP-ID="aac-hi", LANGUAGE="por", NAME="Portuguese", AUTOSELECT=YES,
DEFAULT=NO, URI="adventureland_audio_portuguese_128kbs_AAC/prog_index.m3u8"
#EXT-X-MEDIA:TYPE=AUDIO, GROUP-ID="aac-hi", LANGUAGE="tha", NAME="Thai",
        AUTOSELECT=YES, DEFAULT=NO, URI="adventureland_audio_thai_128kbs_AAC/prog_index.m3u8"
#EXT-X-MEDIA:TYPE=AUDIO, GROUP-ID="aac-lo", LANGUAGE="eng", NAME="English",
        AUTOSELECT=YES, DEFAULT=YES, URI="adventureland_audio_english_64kbs_AAC/prog_index.m3u8"
#EXT-X-MEDIA:TYPE=AUDIO, GROUP-ID="aac-lo", LANGUAGE="fre", NAME="French",
        AUTOSELECT=YES, DEFAULT=NO, URI="adventureland_audio_french_64kbs_AAC/prog_index.m3u8"
#EXT-X-MEDIA:TYPE=AUDIO, GROUP-ID="aac-lo", LANGUAGE="por", NAME="Portuguese", AUTOSELECT=YES,
DEFAULT=NO, URI="adventureland_audio_portuguese_64kbs_AAC/prog_index.m3u8"
#EXT-X-MEDIA:TYPE=AUDIO, GROUP-ID="aac-lo", LANGUAGE="tha", NAME="Thai",
        AUTOSELECT=YES, DEFAULT=NO, URI="advantureland_audio_thai_64kbs_AAC/prog_index.m3u8"
##############################
# Closed caption video Feeds
##############################
#EXT-X-STREAM-INF:BANDWIDTH=4622958,AVERAGE-BANDWIDTH=4000000,CODECS="mp4a.40.2,
avc1.4d401c", AUDIO="aac-hi"
adventureland_video_CC_4_2.9Mbs/prog_index.m3u8
#EXT-X-STREAM-INF:BANDWIDTH=123578,AVERAGE-BANDWIDTH=100000,CODECS="mp4a.40.2, ave1.42e00a",
AUDIO="aac-lo"
adventureland_video_CC_1_60kbs/prog_index.m3u8
#################
# FF/FR i-frames
#################
#EXT-X-I-FRAME-STREAM-INF:BANDWIDTH=53527,AVERAGE-
BANDWIDTH=45000,CODECS="avc1.42e00a",URI="adventureland_video_CC_1_60kbs/iframe.m3u8"
```

Figure 2A:
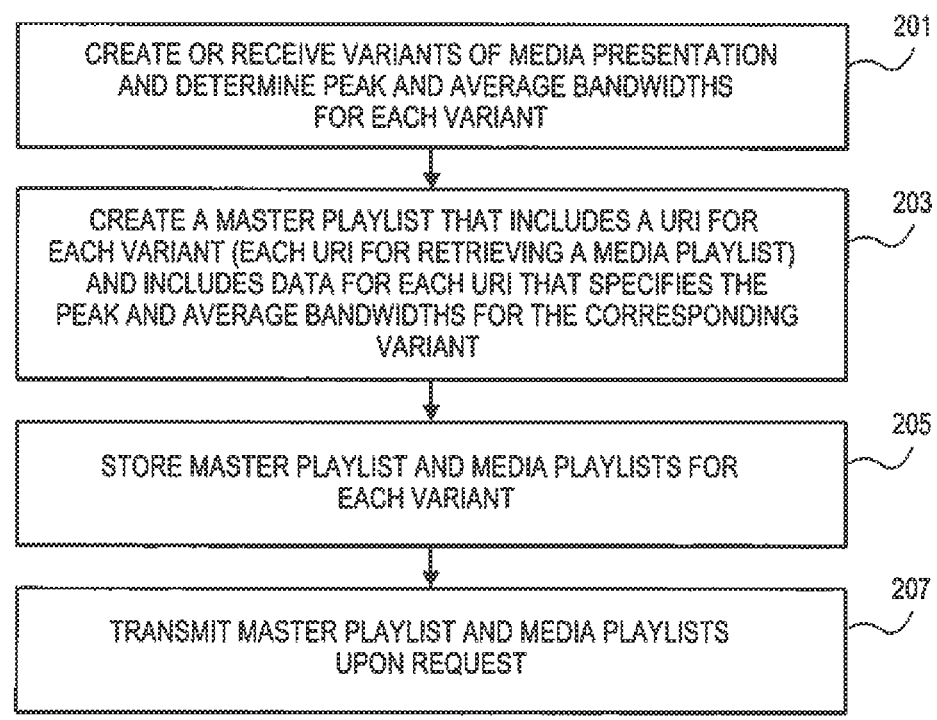
FIG. 2A is a flowchart which shows an example of a method according to one embodiment of the present invention for using average bandwidth to determine whether to switch to another variant.
Figure 4:
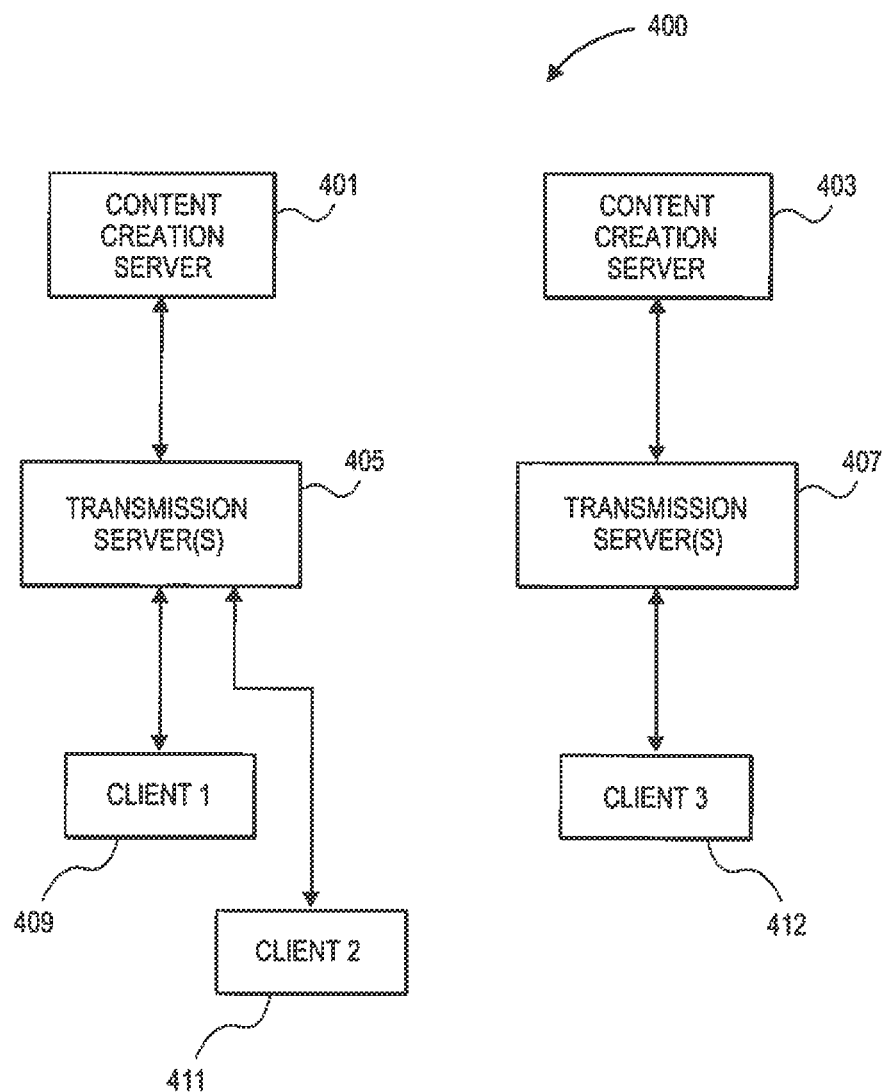
FIG. 4 shows an example of a distributed architecture which can include one or more content creation servers and one or more distribution (e.g., transmission) servers.

FIG. 2A shows an example of a method performed by a server system that provides a master playlist which includes both peak and average bandwidth values for each corresponding variant in the master playlist. In operation 201, one or more server systems create or receive a plurality of variants of a particular media presentation, such as a TV show, a movie, an audio only program, etc. and the one or more server systems determine for each of the variants the peak and average bandwidth or bit rate values. Then, in operation 203, one or more server systems can create a master playlist that includes a URI for each variant, wherein each URI will be used by the client device to retrieve a particular media playlist for the corresponding variant. The master playlist includes in one embodiment, for each variant, the data specifying the peak and average bandwidth values for the corresponding variant. In operation 205 one or more server devices can store the master playlist and the media playlist for each variant which also can be created at this point in time. In operation 207 one or more server devices can transmit the master playlist and one or more media playlists upon request from one or more client devices. In one embodiment, a distributed architecture can be employed in which content creators create the variants and create the master playlist and potentially the media playlists and other server systems distribute or transmit the playlists. FIG. 4, described below, provides an example of a distributed architecture. In another embodiment, the same server system can perform all functions including content creation such as creating the variants and creating the master playlist and the media playlists and also perform the transmission of the master playlist and the media playlist upon requests from client devices.

Figure 2B:
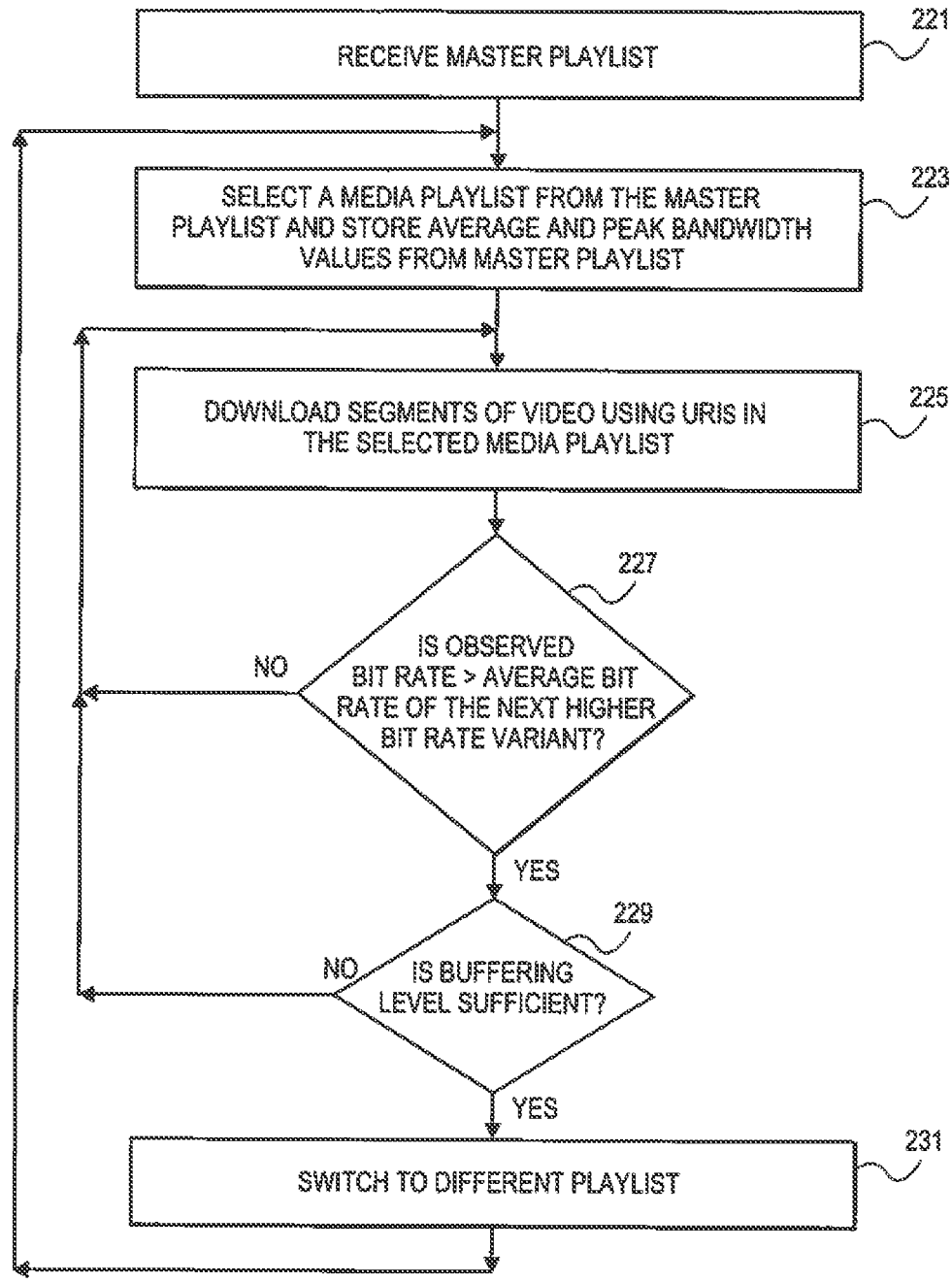
FIG. 2B is a flowchart which shows a method for using the average bit rate to determine whether to switch between variants.

FIG. 2B shows an embodiment that can be performed by a client device which utilizes the average bandwidths in the master playlists, such as the master playlists created as described in conjunction with FIG. 2A. In operation 221, a client device receives a master playlist, which includes the average and peak bandwidth values for variants of the content such as all of the variants for the content. Typically a client device can store the master playlist while the media presentation is being presented so that at any one point in time the client device can use the data in the master playlist to decide when to switch between the variants depending upon network congestion or user preferences, etc. By storing the master playlist during the presentation, the client device can have access to the peak and average bandwidth values for all of the possible variants in the master playlist. Hence, the client device can retrieve the stored peak and average bandwidth values from the master playlist at any point in time during the presentation of a variant obtained from the master playlist in order to facilitate the method shown in FIG. 2B. In operation 223, the client device can select a media playlist (e.g., a first media playlist) from the master playlist and then begin downloading in operation 225 segments of video or audio or both video and audio using the URIs in the first media playlist. In operation 227, the client device can determine whether it can switch up in bit rate. Typically, a client device can switch up (to a higher bit rate variant such as the next higher bit rate variant) when the observed download bit rate (for the current variant being received and displayed) exceeds the average bit rate of the (next) higher bit rate variant. Operation 227 can include a comparison of that observed download bit rate to the average bit rate of the new stream (e.g., from the next higher bit rate variant such as a second media playlist). If in operation 227 the client device determines that the observed bit rate (for the current variant being displayed) is greater than the average bit rate of the (next) higher bit rate variant then the client device proceeds to operation 229 (to check one or more buffers); on the other hand, if the client device determines that the observed bit rate is not greater than the average bit rate then the client device returns to operation 225 (and so the client device continues to download video segments using the current media playlist rather than switching to a new media playlist).

Operation 229 shows an example of how the check of the buffering level can be performed. In particular, in operation 229, the buffer which is currently storing the media that has been retrieved using the URIs from the first media playlist can be examined to determine whether there is sufficient data stored in the buffer to allow enough time to download a new stream (such as another variant from the master playlist) and prepare it for presentation without causing an interruption in the presentation. If there is insufficient data in the buffer, there will not be sufficient time to retrieve a new media playlist (e.g. a "second" media playlist) and download segments from that media playlist. In one embodiment, the following equation can be used as the check for the buffer to determine whether the buffer contains a sufficient amount of data to allow for the switch to occur.

$$(\text{Observed Download bit rate}) \times (\text{No. seconds in buffer}) > (\text{No. of Segments}) \times (\text{Target duration}) \times (\text{Peak Bandwidth})$$

In the example of this equation, the client device compares the multiplication product of the observed download bit rate and the number of seconds in the buffer storing the current variant being presented to the multiplication product of three values: (1) a predetermined number of segments, such as 1 or 2 segments in the new stream; (2) the target duration of a segment in the new stream; and (3) the peak bandwidth value for the new stream. The observed download bit rate is the actual measured bit rate when downloading the content specified by the URIs in the current variant being presented (from the first media playlist). The target duration of a segment in the new stream can be obtained from a media playlist for the new stream, and the peak bandwidth value for the new stream is provided by the variant playlist. If the product of the observed download bit rate and the number of seconds in the buffer exceeds the product of the three values, the buffer has sufficient data to permit a switch from the first variant specified by the first media playlist to the new (e.g., second) variant. It will be appreciated that other embodiments can use alternative equations or mechanisms for determining whether the buffer, which is storing the currently presented media variant, has sufficient data to permit a seamless switch between variants.

If operation 229 determines that the buffering level is sufficient (because the buffer has sufficient data based on the calculation) then processing proceeds to operation 231 (and then operation 223) which involves switching to a different playlist such as the next higher bit rate variant in the master playlist and this switching involves selecting, in operation 223, the different playlist and processing continues as shown in the flowchart of FIG. 2B. In other words, the client device will use the different playlist to retrieve the segments specified in the different playlist and can also repeat operations 227, 229, and 231; in this way, the client device can adapt to changes in network connectivity speeds. If on the other hand the client device determines in operation 229 that the buffering level is not sufficient then processing returns to operation 225 to continue to download segments of video using the currently selected media playlist (and does not switch to a new media playlist). The process of switching between the variants using the different media playlists can use techniques that are known in the art such as methods described in connection with FIGS. 9A-9D in published U.S. Application No. 2012/0311094.

Figure 3:
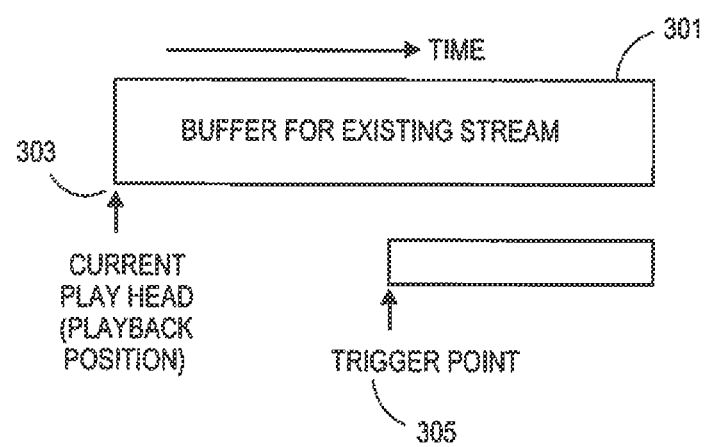
FIG. 3 shows an example of how a buffer for an existing stream can be used to determine when and whether to switch to another variant.

FIG. 3 shows an example of the check (in operation 229) on the amount of data in the buffer. In particular, a trigger point 305 is determined by the peak bandwidth value for the new stream as well as the target duration of a segment in the new stream and at least one or more segments of the new stream. The equation shown above uses the peak bandwidth value of the new stream and the target duration of a segment in the new stream along with at least one or two segments of the new stream in order to determine a number of bits to download which is represented by the trigger point 305 and this is compared against the size of the buffer for the existing stream, shown as buffer 301 in FIG. 3. Buffer 301 is shown as beginning at the current playhead or playback position 303.

The methods and systems described herein can be implemented in a distributed architecture in which multiple server systems or devices provide server services to multiple client devices that can be geographically dispersed over the entire world. FIG. 4 shows an example of a distributed architecture 400 which includes at least two content creation servers 401 and 403. In one embodiment, content creation server 401 can create content for one show or presentation while other content creation servers, such as content creation server 403, can create content for other shows and use different (or some of the same) transmission servers than content creation server 401. These content creation servers can create master playlists and also media playlists as well as create the media (content) segments referenced to by the media playlists. The content creation servers can be located near the location where the content is created (e.g. a sports event such as a baseball game), and each content creation server can transmit the "content" (such as a master playlist and the media playlists and the actual content) to one or more transmission servers, such as transmission servers 405 and 407. In one embodiment, the content creation servers can perform a portion of the operations (such as operations 201, 203 and 205) shown in FIG. 2A while the transmission servers perform the remainder of the operations in FIG. 2A. The transmission servers can be dispersed geographically so that each client device can be served by a transmission server that is geographically close to the client device. In the example shown in FIG. 4, content creation server 401 creates content and playlists, such as one or more master playlists and a plurality of media playlists, and transmits the content (e.g. media segments referred to by the media playlists) and the playlists to one or more transmission servers 405 which in turn will transmit the playlists and content to one or more client devices, such as client devices 409 and 411, upon requests (such as HTTP requests) from those client devices. Similarly, content creation server 403 can create content and playlists and transmit the content and playlists to one or more transmission servers 407 which in turn transmit the playlists and content to one or more client devices, such as client device 412 upon requests from those client devices. In one embodiment, the communications between each of the components in the distributed architecture 400 can be through HTTP over TCP/IP protocols as is known in the art but other protocols can also be used over one or more transmission mediums including wired connections, wireless connections, or a combination of wired and wireless connections.

FIG. 5 is a block diagram of one embodiment of an electronic system that can be used as a server device or client device in one or more embodiments described herein. The electronic system illustrated in FIG. 5 is intended to represent a range of electronic systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative electronic systems may include more, fewer and/or different components. The electronic system of FIG. 5 may be used to provide any one of the client devices and/or the server devices shown in FIG. 4.

Electronic system 800 includes bus 805 or other communication device to communicate information, and processor 810 coupled to bus 805 that may process information. While electronic system 800 is illustrated with a single processor, electronic system 800 may include multiple processors and/or co-processors which together or alone provide a processing system. Electronic system 800 further may include dynamic random memory (DRAM) or other dynamic storage device 820 (referred to as main memory) coupled to bus 805 and may store information and instructions that may be executed by processor 810. Main memory 820 may also be used to store temporary variables or other intermediate information during execution of instructions by processor 810.

Electronic system 800 may also include read only memory (ROM) and/or other static storage device 830 coupled to bus 805 that may store static (e.g., non-volatile) information and instructions for processor 810. Data storage device 840 can be a non-volatile memory device and may be coupled to bus 805 to store information and instructions. Data storage device 840 such as flash memory or a magnetic disk or optical disc and corresponding drive may be coupled to electronic system 800 through bus 805 or may be a remote storage device coupled to system 800 through a network interface. It will be appreciated that any one or more of the memory 820, ROM 830 and storage device 840 can be considered a machine readable non-transitory storage medium that can store executable computer program instructions which can be executed by processor(s) 810 to perform any one of the embodiments or methods described herein. For example, memory 820 can be volatile DRAM memory that stores such computer program instructions and hence this memory 820 is a form of such a machine readable non-transitory storage medium.

Electronic system 800 may also be coupled via bus 805 to display device 850, such as a cathode ray tube (CRT) or liquid crystal display (LCD) or other display devices, to display information to a user. Electronic system 800 can also include an alphanumeric input device 860, including alphanumeric and other keys, which may be coupled to bus 805 to communicate information and command selections to processor 810. Another type of user input device is cursor control 870, such as a touchpad, a mouse, a trackball, or cursor direction keys to communicate direction information and command selections to processor 810 and to control cursor movement on display 850.

Electronic system 800 further may include one or more network interface(s) 880 to provide access to a network, such as a local area network. Network interface(s) 880 may include, for example, a wireless network interface having antenna 885, which may represent one or more antenna (e). Electronic system 800 can include multiple wireless network interfaces such as a combination of WiFi, Bluetooth and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, other cellular telephone protocols and/or any other type of wireless communications protocol.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable storage medium storing executable program instructions which when executed by a data processing system cause the system to perform a method for processing media specified in one or more playlists, the method comprising:
   receiving, by the system, data representing a plurality of variants of a video media, wherein each variant uses a different encoding from the other of the plurality of variants, and each variant has already been encoded when received;
   determining a peak bandwidth and an average bandwidth for each of the plurality of variants of the video media, each variant showing the same video media but using different encodings, wherein the peak bandwidth of a variant is a constant computed from the encoded media segments of the video media as the maximum bit rate of any encoded media segment in a plurality of encoded media segments of the variant of the video media, and the average bandwidth is computed as an average bit rate over the amount of time of presenting content in a plurality of media segments of the variant of the video media, wherein the peak and average bandwidths for each variant are determined by the system after encoding the media files and before creating an master playlist;
   creating and storing a media playlist for each of the plurality of variants;
   creating the master playlist that includes a Universal Resource Indicator (URI) for each variant, each URI in the master playlist referencing a media playlist for one of the variants for use in retrieving the media playlist for the variant, and the master playlist includes data that specifies the peak bandwidth and the average bandwidth for the video media for each of the variants;
   storing the master playlist;
   transmitting the master playlist upon request from one or more client devices;
   transmitting a first media playlist for a first variant referred to in one of the URIs in the master playlist in response to a request from a client device;
   transmitting one or more encoded media files referred to in the first media playlist in response to one or more requests from the client device for encoded media files of the first variant; and
   transmitting, to the client device, a second media playlist for a second variant referred to in the master playlist in response to a subsequent request from the client device, the client device having determined that there is a sufficient amount of encoded media segments stored in a buffer of the client device to transition to the second media playlist for the second variant.

2. The medium as in claim 1 wherein determining by the client device that there is a sufficient amount of encoded media segments stored in the buffer to transition to the second media playlist for the second variant is based at least upon an observed download bit rate of encoded media files that are in the buffer and further based upon by a time, estimated by the client device, to download a predetermined number of encoded media segments of the second variant, each having a predetermined duration, and a peak bandwidth of the second variant.

3. The medium as in claim 1 wherein the peak bandwidth of the second variant is a constant computed as the maximum bit rate of any encoded media segment in the second variant in the stream of video media over a period of time which is less than the entire presentation time of the video media.

4. A non-transitory machine readable storage medium storing executable program instructions which when executed by a data processing system cause the system to perform a method for processing media comprising:
   receiving, by the system, a master playlist that includes a Universal Resource Indicator (URI) for a media playlist for each variant of a plurality of variants of a video media, each variant in the master playlist showing the same video media but using different encodings, and the master playlist specifying a peak bandwidth and an average bandwidth for each variant, wherein the peak bandwidth of a variant is a constant computed from the encoded media segments of each variant as the maximum bit rate of any encoded media segment in a plurality of encoded media segments of the variant of the video media, and the average bandwidth is an average bit rate of a total amount of transmitted content over the amount of time of transmitting the content in a plurality of encoded media segments that make up the transmitted content of the variant of the video media, wherein the peak and average bandwidth are determined after encoding the media segments for each variant and before creating the master playlist;
   selecting from the master playlist, and receiving, a first media playlist, the first media playlist including URIs for encoded media segments of a first variant of the plurality of variants;
   determining an observed bit rate during the downloading of the segments of the first variant;
   storing media of the first variant in a buffer before displaying the media;
   determining whether an amount of data of the stored media in the buffer exceeds an estimated value;
   comparing the average bandwidth for a second variant to the observed bit rate; and
   switching to the second variant in response to determining that the amount of data in the buffer exceeds the estimated value and in response to determining that the observed bit rate exceeds the average bandwidth, wherein the estimated value represents an amount of data in the second variant to be downloaded to the client device buffer before the video media is viewed in the second variant.

5. The medium as in claim 4 wherein the second variant provides a higher quality encoding of the video media and wherein the estimated value is based at least in part on a time, estimated by the client device, to download a predetermined number of the encoded segments of the second variant, each having a predetermined duration, and a peak bandwidth of the second variant.

6. The medium as in claim 4 further comprising:
switching back to the first variant when network bandwidth falls substantially.

7. The medium as in claim 4 wherein the peak bandwidth is defined by an amount of data in a stream of video media over a period of time which is less than the entire presentation time of the video media and the average bandwidth is defined by an average of a rate of data transmitted over the entire presentation time and wherein the peak bandwidth is greater than the average bandwidth for each variant of the video media.

8. A non-transitory machine readable storage medium storing executable program instructions which when executed by a data processing system cause the data processing system to perform a method comprising:
storing a master playlist that includes Universal Resource indicators (URIs) for each variant of a plurality of variants of a video media, wherein each variant is in a different encoding from the other of the plurality of variants, and each variant has been encoded before the storing of the master playlist, each URI for use in retrieving a media playlist for one of the variants, and the master playlist includes data that specifies a peak bandwidth and an average bandwidth for video media for each of the variants, wherein the peak bandwidth of a variant is computed as the maximum bit rate of any media segment in a plurality of media segments of the variant of the video media, and the average bandwidth is computed as an average bit rate over the amount of time of presenting content in the plurality of media segments of the variant of the video media, wherein the peak and average bandwidths for each variant are determined by the system;
transmitting the master playlist to a client device in response to a request from the client device;
transmitting a first media playlist for a first variant referred to in one of the URIs in the master playlist;
transmitting a plurality of encoded media files of the first variant to a client device;
receiving from the client device a request for a second media playlist of a second variant, in response to the client device determining that there is a sufficient amount of media data in a buffer of the client device to transition to the second media playlist for the second variant without interrupting playback of the video media.

9. The medium as in claim 8, the method further comprising:
after transmitting to the client device the first media playlist of the first variant referred to in one of the URIs in the master playlist; then
transmitting, in response to an HTTP request from the client device, one or more encoded media segments referred to in the first media playlist of the first variant.

10. The medium as in claim 9 wherein determining, by the client device, that there is sufficient data in the buffer to transition to the second media playlist of the second variant is based at least on part on the observed bit rate times the duration of data in the buffer being greater than a predetermined number of encoded media segments of the second variant times the peak bandwidth of the second variant times a predetermined duration of the encoded media segments of the second variant.

11. The medium of claim 4, wherein the data processing system comprises a client device and the client device retrieves the stored peak and average bandwidth values from the master playlist for one or more variants at any time during the presentation of the video media using the selected variant.

12. The medium of claim 1, wherein the plurality of video encoded media segments over which the peak bandwidth and average bandwidth of a variant are computed comprise the entire content of the video media.

13. The medium of claim 4, wherein the number of encoded media segments of the second variant is one segment or two segments.

* * * * *